United States Patent [19]

Freimark et al.

[11] Patent Number: 4,764,896
[45] Date of Patent: Aug. 16, 1988

[54] MICROPROCESSOR ASSISTED MEMORY TO MEMORY MOVE APPARATUS

[75] Inventors: Ronald J. Freimark, Scottsdale; Steven A. Rose, Mesa, both of Ariz.

[73] Assignee: Honeywell Inc., Phoenix, Ariz.

[21] Appl. No.: 750,797

[22] Filed: Jul. 1, 1985

[51] Int. Cl.⁴ .............................................. G06F 9/00
[52] U.S. Cl. .................................................... 364/900
[58] Field of Search .............................. 364/200, 900

[56] References Cited

U.S. PATENT DOCUMENTS

| | | | |
|---|---|---|---|
| 4,371,932 | 2/1983 | Dinwiddie, Jr. et al. | 364/200 |
| 4,450,521 | 5/1984 | McDonough et al. | 364/200 |
| 4,454,575 | 6/1984 | Bushaw et al. | 364/200 |
| 4,476,522 | 10/1984 | Bushaw et al. | 364/200 |
| 4,535,404 | 8/1985 | Shenk | 364/200 |

*Primary Examiner*—Gareth D. Shaw
*Assistant Examiner*—John G. Mills, III
*Attorney, Agent, or Firm*—A. A. Sapelli; D. Lenkszus; A. Medved

[57] ABSTRACT

An apparatus for controlling data movement between a peripheral and a data processing system, comprises a memory for storing data, wherein the memory comprises a plurality of memory modules. Each memory module corresponds to an assigned area of a first memory map, the first memory map being duplicated into a plurality of mirrored memory maps. Each mirrored memory map corresponds to a predefined operation, a composite of the first memory map and the plurality of mirrored memory maps forming a total memory space. Each memory location within the total memory space is defined by a unique memory space address. A processor performs a pseudo operation in response to a first control signal from the peripheral indicating data is available for being moved. A logic circuit generates at least one control signal in response to the pseudo operation such that a predetermined data movement operation occurs.

5 Claims, 3 Drawing Sheets

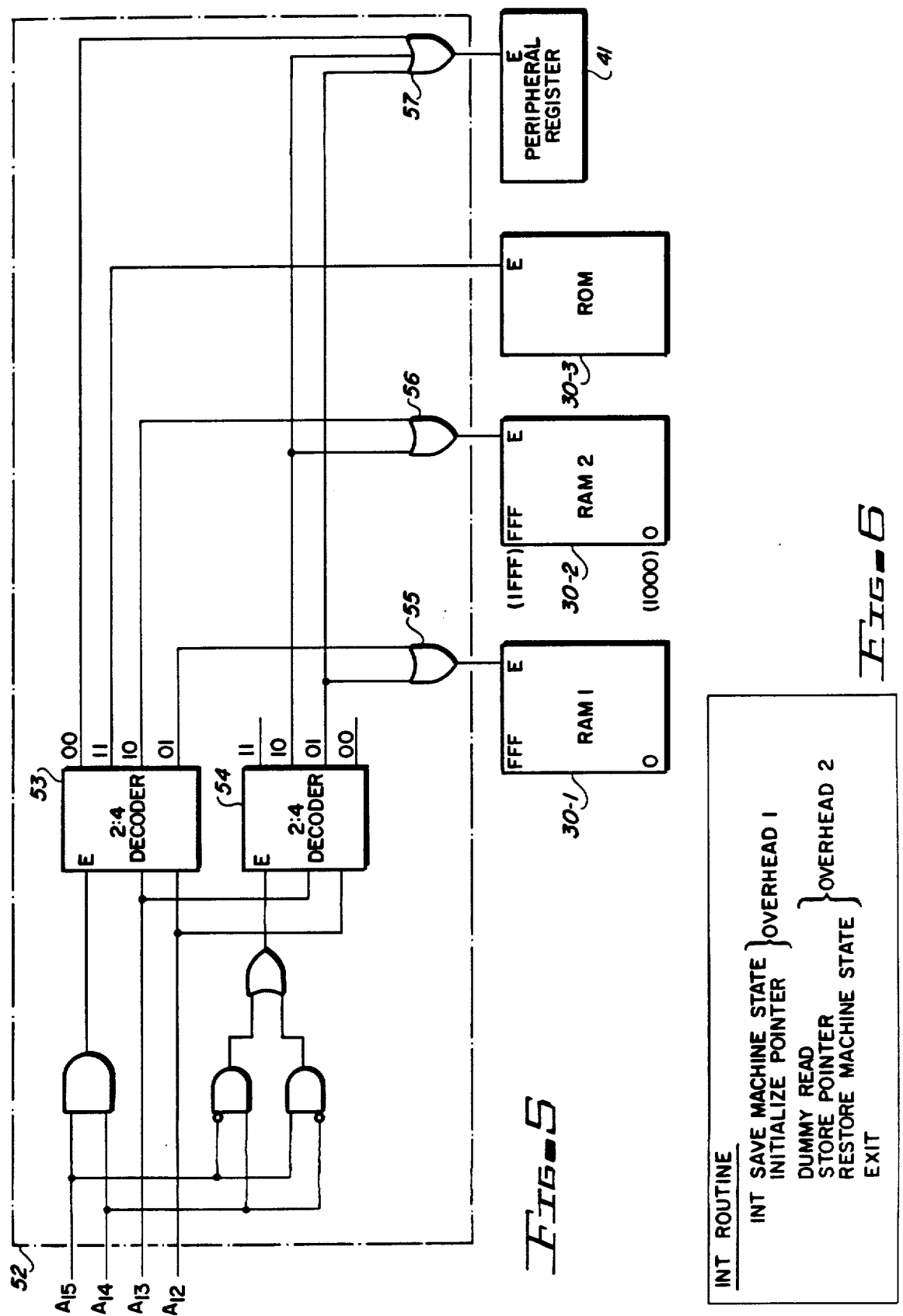

MICROPROCESSOR ASSISTED MEMORY TO MEMORY MOVE APPARATUS

BACKGROUND OF THE INVENTION

This invention relates to information movement within a data processing system generally between a memory unit of the data processing system and a peripheral, and more specifically, relates to a microprocessor based input/output (I/O) controller.

Microprocessor based systems, especially those used as intelligent peripheral controllers, are often faced with a time critical data movement problem. In its simplest form, this problem is one of moving data from a buffer in a peripheral controller device (which appears to the microprocessor as a single location in a memory map) to an ordered array of sequential locations in memory (RAM).

In present systems, the peripheral controller device is usually equipped with a control line to indicate that data in the buffer is ready to be moved. This control line is usually connected to an interrupt terminal of the microprocessor. Upon the occurrence of a data ready signal at the interrupt terminal, the microprocessor causes a plurality of operations to be performed. These operations include saving the state of the machine (i.e., the microprocessor). Data is moved from the buffer of the peripheral controller to an internal register of the microprocessor. Next, an index register is loaded with a previously saved pointer, and then the data is moved from the internal register to a location in a RAM pointed to by the index register. The quantity in the index register is incremented and saved for the next data movement, and finally the machine is restored to the state existing before the interrupt occurred.

If there is sufficient time to execute all of these steps before the peripheral controller device has a data overrun, this method of data movement is simple and works very well. But, as data transfer speeds increase, especially in high density floppy, winchester or communications applications, the microprocessor will run out of time to perform all of the above operations before the next piece or quantum (usually a byte or a word) of data is available.

Hence, there is a need to provide an apparatus for performing the desired data movement at the high speed transfer rates required in the aforementioned applications.

SUMMARY OF THE INVENTION

Therefore, there is supplied by the present invention, in a data processing system, an apparatus for controlling data movement between a peripheral and the data processing system. The apparatus comprises a memory for storing data, wherein the memory comprises a plurality of memory modules, each memory module having a plurality of addressable locations. Each memory module corresponds to an assigned area of a first memory map, the first memory map being duplicated into a plurality of mirrored memory maps. Each mirrored memory map corresponds to a predefined operation, and further a composite of the first memory map and the plurality of mirrored memory maps form a total memory space. Each memory location within the total memory space is defined by a unique memory space address. A processor performs a pseudo operation in response to a first control signal from the peripheral indicating data is available for being moved. A logic circuit operatively connected to the memory, the processor, and the peripheral, generates at least one control signal in response to the pseudo operation such that a predetermined data movement operation occurs.

Therefore, it is an object of the present invention to provide an apparatus to perform a data move operation.

It is another object of the present invention to provide an apparatus to perform a data move operation with significantly reduced steps.

It is still another object of the present invention to provide an apparatus to perform a data move operation with significantly reduced steps thereby reducing the time required to perform the data move operation.

It is still a further object of the present invention to provide an apparatus to perform a high speed data move operation.

These and other objects of the present invention will become more apparent when taken in conjunction with the following description and attached drawings, wherein like characters indicate like parts and which drawings form a part of the present application.

BRIEF DESCRIPTION OF THE DRAWINGS

FIG. 4, which is comprised of FIGS. 4A and 4B, shows input and output connections to a multiplexer for switching control signals thereby activating the appropriate circuitry to accomplish the desired operation;

FIG. 5 shows a logic block diagram of enable logic; and

FIG. 6 shows the steps in an interrupt routine performed by a microprocessor of the data processing system of the preferred embodiment of the present invention to initiate the data move operation.

DETAILED DESCRIPTION

Figure 1:
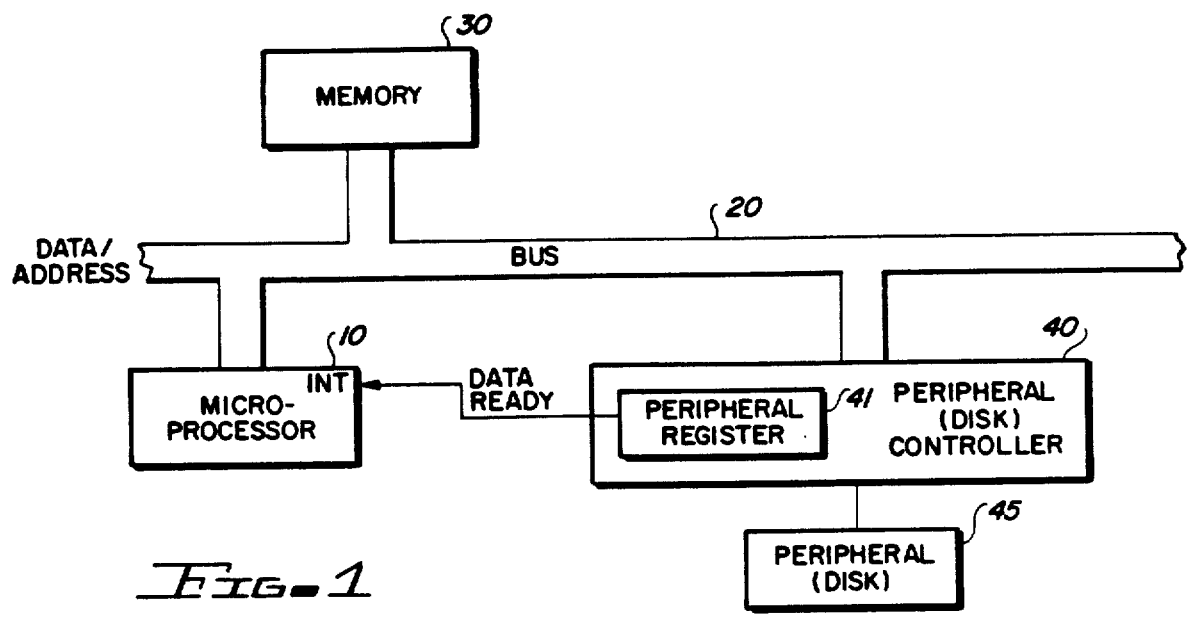
FIG. 1 shows a block diagram of a data processing system in which the present invention can be employed.

Referring to FIG. 1, there is shown a block diagram of a data processing system in which the present invention can be employed. A microprocessor (up) 10 is operatively connected to a bus 20, having data and address lines. A memory 30 and a peripheral controller 40 are also operatively connected to the bus 20. A peripheral device 45 is operatively connected to the peripheral controller 40. Although, the preferred embodiment of the present invention specifically shows a disk controller and a disk device for the peripheral controller 40 and the peripheral 45, respectively, it will be understood by those skilled in the art that the present invention is applicable to a wide variety of peripheral controllers and peripheral devices. The peripheral controller 40 includes a buffer (or peripheral register) 41 which temporarily stores data from the bus 20 or from the peripheral 45. The discussion hereinunder focuses on transfers between the peripheral controller 40 and the data processing system, i.e., the memory 30 and the microprocessor 10, to specifically cover the peripheral controller 40—data processing system interface rather than the peripheral controller 40—peripheral device 45 interface, since the invention herein lies in the data processing system—peripheral controller 40 data transfers.

Figures 2, 4A, 4B:
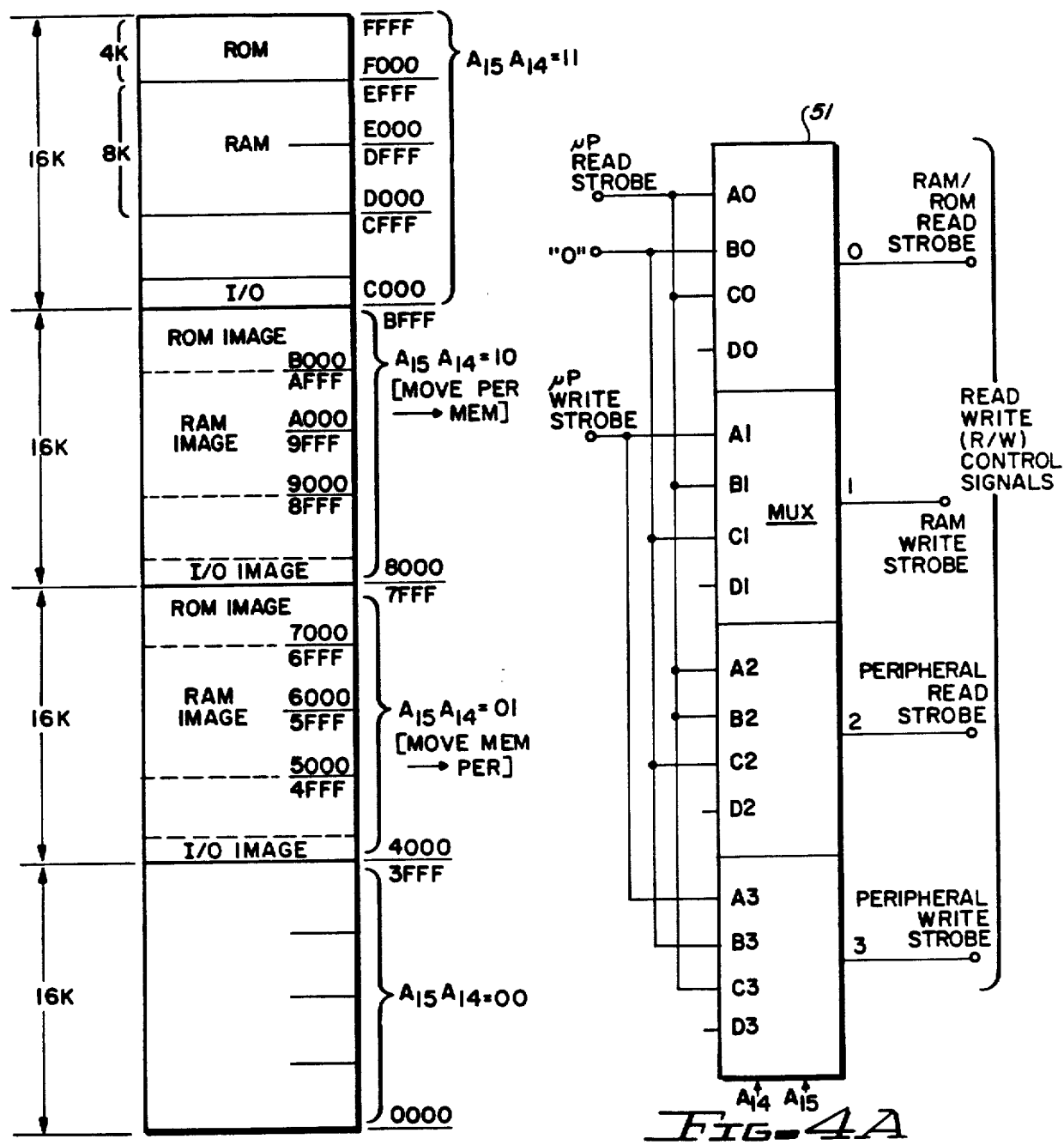
FIG. 2 shows a defined memory map of the preferred embodiment of the present invention.

Referring to FIG. 2, there is shown a memory map of the preferred embodiment of the present invention. The memory 30 (also referred to herein as memory modules) of the data processing system of the preferred embodiment of the present invention is mapped to four 16K segments, the four segments forming a total memory space. Sixteen address lines $A_{15}$–$A_0$ where $A_0$ is the least significant bit, are utilized in bus 20. The upper 16K segment (locations C000–FFFF hexadecimal, all memory locations given herein are in hexadecimal) is mapped to include a 4K ROM from locations F000–FFFF, and 8K RAM from locations D000 to EFFF, and an I/O register at location C000. For this defined upper segment, 16K of memory, address bits $A_{15}$ and $A_{14}$ are both a logic one. This upper 16K of memory is also referred to herein as the first segment of memory.

The next, or second, 16K of the defined memory map from location 8000 to BFFF includes a 4K ROM image, an 8K RAM image, and an I/O register image which mirrors (or duplicates) the first segment. In the second segment, 16K of defined memory, $A_{15}$ is a logic one and $A_{14}$ is a logic zero. The third 16K segment of the defined memory map from locations 4000 to 7FFF also includes a 4K ROM image, an 8K RAM image and an I/O register image which mirrors the upper segment. In the third 16K of defined memory, $A_{15}$ is a logic zero and $A_{14}$ is a logic one. The fourth segment (or lower) 16K of the defined memory map from locations 0000 to 3FFF is not utilized in the preferred embodiment of the present invention. The second segment of memory is addressed when a data movement is to be performed from the peripheral register 41 to RAM memory, and the third segment of memory is addressed when a data move operation is to be performed from memory to the peripheral register 41. This operation will be described in further detail hereinunder. The addresses 0000–FFFF are the memory space addresses within the total memory space.

Figure 3:
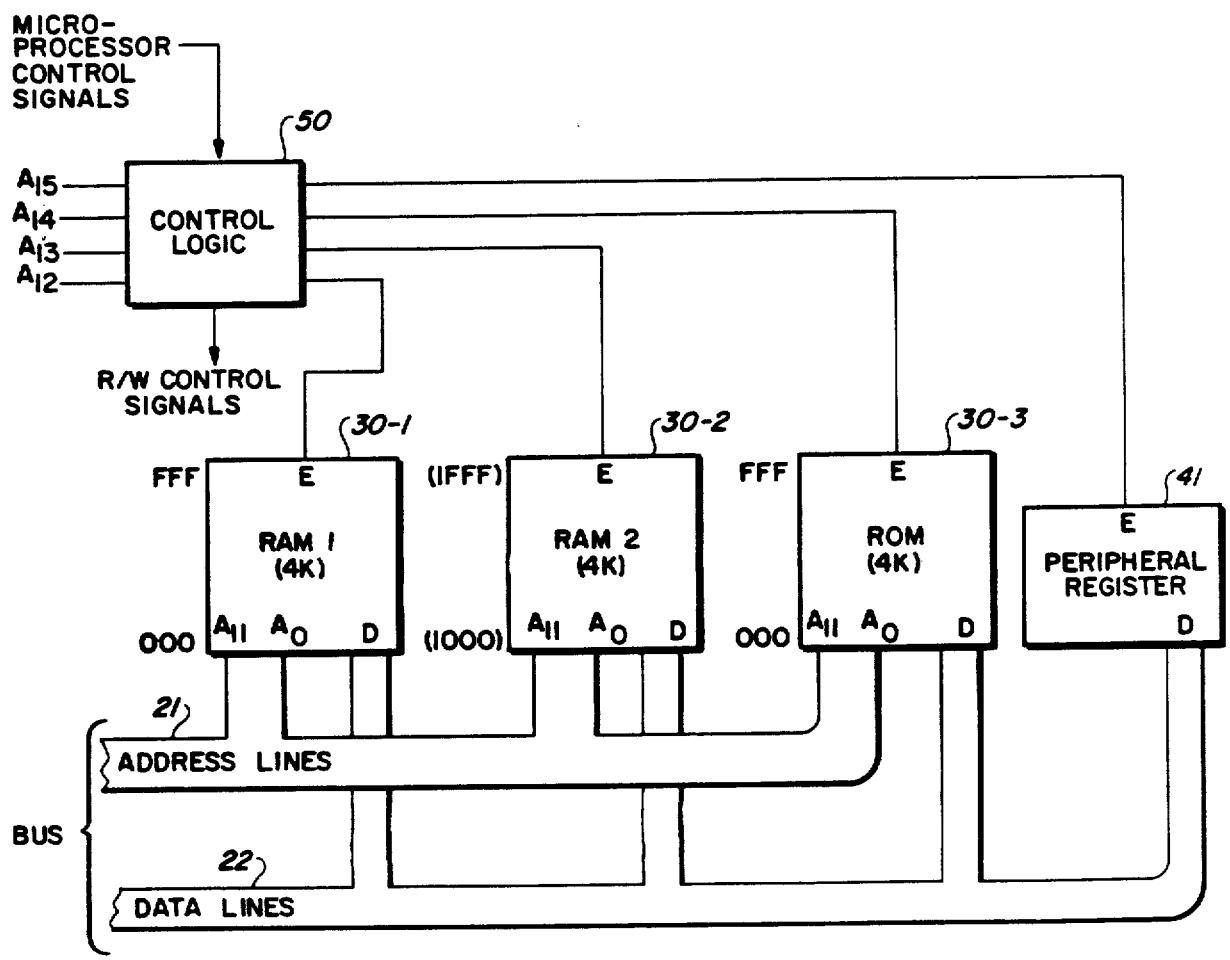
FIG. 3 shows a block diagram of physical memory of the preferred embodiment of the present invention.

Referring to FIG. 3, there is shown a block diagram of the first segment of physical memory 30 of the preferred embodiment of the present invention. The first segment of memory 30 of the preferred embodiment of the present invention includes a 4K ROM memory module 30-3 having real addresses 000–FFF, a first 4K RAM1 memory module 30-1 having real addresses 000–FFF, and a second 4K RAM2 memory module 30-2 having real addresses 000–FFF and further having pseudo addresses 1000–1FFF. Address lines 21, $A_{11}$–$A_0$ of bus 20, are operatively connected to the corresponding 12 terminals of the ROM 30-3, RAM1 30-1 and RAM2 30-2. These 12 address lines which carry the corresponding address signals from microprocessor 10 are sufficient to address any location within a 4K space. $A_{15}$, and $A_{14}$ are the upper bits utilized to address one of the 16K segments areas, and $A_{13}$, $A_{12}$ are utilized to address a module within the selected segment. In order to avoid memory accesses to a location within the multiple 4K modules, an enable signal is coupled from control logic 50. The control logic 50 generates the proper to enable signal by decoding address information contained on address lines $A_{15}$–$A_{12}$, the control logic 50 to be described in detail hereinunder. An enable signal from control logic 50 is also coupled to enable terminal, E, of peripheral register 41. Data lines 22 of bus 20 are connected to the corresponding data terminals, D, of the ROM and RAM memory modules and the data terminals of the buffer module in which peripheral register 41 is located. It will be understood that if more than a single peripheral register 41 is utilized in the peripheral controller 40, address lines 21 can be coupled to corresponding address terminals of the peripheral registers (not shown) in order to address a signal peripheral registers.

Referring to FIG. 4A and 4B, which together make up FIG. 4, there is shown a block diagram of a multiplexer, MUX, 51 which switches the control signals from the control logic 50 to the appropriate memory module 30 and/or peripheral register 41, thereby achieving the desired operation. The microprocessor read strobe signal is connected to input terminal A0, C0, B1, A2, B2, and C3. Input terminal B0, C1, C2, and B3 are tied to a logic zero which is effectively a disabling signal. The microprocessor write strobe signal is connected to input terminals A1 and A3. The output of MUX 51, outputs 0–3 are connected to the RAM/ROM read strobe terminal of the memory modules 30, RAM write strobe terminal of RAM 30-1, 30-2, peripheral read strobe terminal, and peripheral write strobe terminal, respectively. Address signals $A_{15}$ and $A_{14}$ are utilized to select between input terminals A, B, and C, in accordance with the table of FIG. 4B. In a normal operation by the microprocessor 10 in which the microprocessor is accessing the memory modules 30 and/or the peripheral register 41, the microprocessor is addressing memory space in which $A_{15}$ and $A_{14}$ are a logic one. Hence, the A input terminals of MUX 51 are selected. In this case the microprocessor read strobe signal is coupled to the RAM/ROM read strobe terminal and is also coupled to the peripheral read strobe terminal via output terminal 2. Hence, normal reads are made from the ROM 30-3, RAM 30-1, 30-2, or the peripheral register 41 by the microprocessor 10. When write operations are performed, the microprocessor 10 again addresses address space is which $A_{15}$ and $A_{14}$ are both a logic one and the write strobe signal is coupled to the RAM write strobe terminal or the peripheral write strobe terminal as a function of the particular address, thereby performing normal write operations to the RAM 30-1, 30-2 or the peripheral register 41.

In an I/O operation, the microprocessor 10 also acts as a controller. When the peripheral register 41 has data to be transferred, assuming a read operation of the peripheral device 45, the data ready signal is generated by the peripheral controller 40, thereby interrupting the microprocessor 10. The microprocessor 10 then causes the data stored in peripheral register 41 to be directly inputted into memory bypassing the operation of reading the data into an internal register of the microprocessor and then outputting the data into memory 30. The microprocessor performs a "dummy read" of the RAM address in which the data is to be stored. The address space addressed is the second 16K of the defined memory map in which $A_{15}$ and $A_{14}$ are a logic one and a logic zero, respectively. This causes the B input terminals of MUX51 to be selected. The "dummy read" from the microprocessor causes the read strobe signal to be coupled via input B1 to the RAM write strobe terminal. The microprocessor "dummy read" also causes the read strobe signal to be coupled via input B2 to the peripheral read strobe terminal, the peripheral write strobe being disabled by the logic zero input via input B3. Hence, the peripheral operation is a read, or output of the data, the data being placed on the data lines 22 and the RAM accepts the data that is present on the data lines 22 and is written into the RAM at the address specified on the address lines, the address being the address of the "dummy read" operation. Hence, data is transferred directly from the peripheral register 41 into the RAM and bypasses the transfer of the data into the microprocessor 10. RAM1 30-1 and RAM2 30-2 both have addresses corresponding to the address on the address line but only a single RAM, i.e., either RAM1 or RAM2, is selected as a function of the enable signal. The generation of the proper enable signal to select the correct RAM, i.e., RAM1 or RAM2, will be discussed hereinunder. When a write operation from memory to the peripheral register 41 is to be performed, the microprocessor performs a "dummy read" operation of the address in memory to be read, and addresses the third 16K area in which $A_{15}$ is a logic zero and $A_{14}$ is a logic one, this area having been defined as the data move from memory to the peripheral, this having been described in conjunction with FIG. 2 above. In this memory space input terminals C are selected. In this case the microprocessor "dummy read" causes the microprocessor read strobe signal to be coupled to the RAM read terminal and also causes the microprocessor read strobe signal to be coupled to the peripheral write terminal. Hence, the data is placed on the data lines 22 from the RAM and the data present on the data lines 22 is written into the peripheral register 41. Again, the enable signals coupled to the memory modules 30 cause data from a single RAM 30-1, 30-2, or ROM 30-3 to place data on the data lines 22. This operation again bypasses the microprocessor having to read the data into the internal register and then outputting the data to the peripheral controller 41. The logic zero connected to the input terminals assures the control signal is zero, disabling the particular function. The D input terminals of MUX51 are not utilized in the preferred embodiment of the present invention.

Referring to FIG. 5, there is shown a block diagram of enable logic 52 of the control logic 50. The enable logic 52 generates an enable signal for each of the memory modules 30-1, 30-2, 30-3, and for the peripheral register 41, the enable signal being coupled to the corresponding enable terminal, E, of each module. When the microprocessor 10 is accessing the memory modules 30 or the peripheral register 41, the first 16K address space is utilized and $A_{15}$ and $A_{14}$ are both a logic one, enabling a first (2:4) decoder 53. The decoder decodes the signals associated with address lines $A_{13}$ and $A_{12}$. These two signals identify the particular module being addressed. Hence when $A_{13}$ is a logic zero and $A_{12}$ is a logic zero, the peripheral register 41 is being addressed by the microprocessor, and the enable signal is coupled to the peripheral register 41 via an OR gate 57. When $A_{13}$ and $A_{12}$ are both a logic one, the ROM module 30-3 is being addressed and the enable signal is directly coupled to the ROM. When the RAM is being addressed by the microprocessor 10, for address locations between D000 and DFFF, $A_{13}$ is a logic zero and $A_{12}$ is a logic one, thereby generating an enable signal which enables OR gate 55 allowing accesses to RAM1 30-1. Similarly, when the microprocessor is addressing memory locations E000 through EFFF of RAM the first decoder 53 decodes $A_{13}$ as a logic one and $A_{12}$ as a logic zero generating an enable signal which enables OR gate 56 thereby allowing accesses to RAM2 30-2. In the movement of data between the peripheral register 41 and the RAMS 30-1, 30-2, a second (2:4) decoder 54 is enabled which enables either RAM1 30-1 or RAM2 30-2 as a function of the address information signals on address lines $A_{13}$ and $A_{12}$, the corresponding enable signal being coupled to the OR gate 57 for enabling the peripheral register 41 and the corresponding RAM1 or RAM2. A read or write operation of the peripheral register 41 or the RAM 30-1, 30-2 is a function of the control signals from the multiplexer 51.

Referring to FIG. 6, there is shown the operations performed by the interrupt routine of the microprocessor. As discussed before, when the peripheral register 41 is full and contains data ready to be transferred, the data ready signal is generated and is coupled to the interrupt terminal of the microprocessor 10. The microprocessor performs the operations of the interrupt routine of FIG. 6. Namely, a first overhead operation is performed which requires saving the machine state and initializing a pointer which defines the memory location in which the data is to be stored. A "dummy read" is then performed to the location in which a data access is to be made, the location being defined in address bits $A_{13}-A_0$. The address space addressed by bits $A_{13}-A_0$ is sufficient to address any location within the defined 16K. $A_{15}$ and $A_{14}$ are included in the address signals placed on the address lines 21 which define which operation is to be performed, the type of operation being equated to one of four 16K areas as defined by the memory map as discussed above. Once the "dummy read" operation is performed, the second overhead operation is executed which essentially restores the pointer and restores the machine state. Then the interrupt routine is exited and the microprocessor continues to perform or execute its application program or task which was underway prior to the interrupt. In the preferred embodiment of the present invention, a Motorola 68000 microprocessor is utilized, and the steps required to perform the various overhead operation are minimized. This reduces the amount of overhead, thereby reducing the amount of time within the interrupt routine. This reduction in overhead allows the microprocessor to perform its task and also act as a direct memory access controller and not encounter an over-run condition. (An over-run condition occurs when the next piece or quantum of data is available in the peripheral register 41 before the microprocessor has had a chance to move the previous piece of data.) It will be understood by those skilled in the art that outputting data from memory 30 to the peripheral register 41 a similar operation is performed. Namely, a data request signal from the peripheral register is coupled to the microprocessor 10 which results in an interrupt to the microprocessor 10. A "dummy read" in the interrupt routine is then performed from the third 16K memory space in which $A_{15}$ is a logic zero and $A_{14}$ is a logic one.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

We claim:

1. In a data processing system including a peripheral controller for controlling data movement between a peripheral register and memory means using an address and data bus, and a microprocessor operatively connected to the data and address bus, to the peripheral controller and the memory means, wherein the improvements comprise:

said memory means including a plurality of memory segments with each memory segment including a plurality of memory modules and each memory module having a plurality of addressable locations for storing data;

a first memory segment being utilized for moving data from a RAM module of the first memory segment to a peripheral register at an addressable location of a buffer module of the first memory segment;

a second memory segment, said second memory segment being utilized for moving data from a peripheral register of a buffer module of the second segment to a RAM module of the second segment, the size and location of corresponding memory modules of the first and second segments being the same;

said peripheral controller means producing a first control signal when data stored in peripheral register of the second segment is to be moved to the addressable memory location of a RAM module of the second memory segment and a second control signal when data is to be moved from a RAM module of the first segment to a peripheral register in the buffer module of the first segment;

said processor means performing an interrupt routine through a pseudo operation in response to the peripheral controller producing a first or second control signal, said processor means producing address signals of an addressable location of a RAM module of one of the two segments used for such data moves and read/write control signals; and logic means operatively connected to said memory means, to said processor means, and to the said peripheral controller for generating logic control signals in response to selected address signal and read/write control signal produced by the microprocessor, said logic control signals causing predetermined data movement to occur between a given memory location of a RAM module and a given peripheral register of a memory segment of said memory means, thereby enabling a desired data move to occur in one of the two segments and preventing other data movement from occuring at the same time.

2. In the data processing system of claim 1 in which the number of memory segments of the memory means is four.

3. In the data processing system of claim 2 in which the modules of the first and second memory segments include a ROM module of 4K addressable locations two RAM modules each having 4K of addressable locations and one buffer module having at least one addressable location which is used as a peripheral register.

4. In the data processing system as defined in claim 3 in which in the microprocessor in executing a pseudo instruction produces binary address signals, the two most significant bits of which identify the memory segment in which an addressable location is located.

5. In the data processing system as defined in claim 4 in which the next two higher address bits produced by the microprocessor in executing a pseudo instruction identify the module in which data stored in the module is to be moved from which it is to be moved.

* * * * *